(12) United States Patent
Wang et al.

(10) Patent No.: US 7,996,378 B2
(45) Date of Patent: Aug. 9, 2011

(54) SYSTEM AND METHOD FOR GRAPHICALLY DISTINGUISHING LEVELS OF A MULTIDIMENSIONAL DATABASE

(75) Inventors: Huifang Wang, Cary, NC (US); Lina Clover, Cary, NC (US); Walden B. Crabtree, Raleigh, NC (US); Douglas R. Dotson, Pittsboro, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 13/008,413

(22) Filed: Jan. 18, 2011

(65) Prior Publication Data

US 2011/0119227 A1    May 19, 2011

Related U.S. Application Data

(63) Continuation of application No. 11/063,469, filed on Feb. 22, 2005, now abandoned.

(51) Int. Cl.
    *G06F 17/30* (2006.01)
(52) U.S. Cl. .................................... 707/705
(58) Field of Classification Search .................. 707/600, 707/609, 705, 790
    See application file for complete search history.

(56) References Cited

U.S. PATENT DOCUMENTS

| | | | |
|---|---|---|---|
| 5,767,854 A | 6/1998 | Anwar | |
| 5,926,820 A | 7/1999 | Agrawal et al. | |
| 6,182,060 B1 | 1/2001 | Hedgcock et al. | |
| 6,456,999 B1 | 9/2002 | Netz | |
| 6,470,344 B1 | 10/2002 | Kothuri et al. | |
| 6,484,179 B1 | 11/2002 | Roccaforte | |
| 6,546,135 B1 | 4/2003 | Lin et al. | |
| 6,581,068 B1 | 6/2003 | Bensoussan et al. | |
| 6,728,724 B1 | 4/2004 | Megiddo et al. | |
| 6,750,864 B1* | 6/2004 | Anwar | 345/440 |
| 6,898,603 B1 | 5/2005 | Petculescu et al. | |
| 7,089,266 B2 | 8/2006 | Stolte et al. | |
| 7,133,876 B2 | 11/2006 | Roussopoulos et al. | |
| 2004/0111388 A1 | 6/2004 | Boiscuvier et al. | |
| 2005/0066277 A1 | 3/2005 | Leah et al. | |

OTHER PUBLICATIONS

De Prisco et al., "On Optimal Binary Search Trees", Information Processing Letters, vol. 45, pp. 249-253 (Apr. 1993).
Pedersen et al., "Multidimensional Database Technology", IEEE, Computer, vol. 34, Issue 12, pp. 40-46 (Dec. 2001).

* cited by examiner

*Primary Examiner* — Fred I Ehichioya
(74) *Attorney, Agent, or Firm* — Jones Day

(57) ABSTRACT

In accordance with the teachings described herein, systems and methods are provided for graphically distinguishing levels from a multidimensional database. Levels from a multidimensional database are distinguished, such as by associating two or more of database's levels with a plurality of different visual indicators.

14 Claims, 16 Drawing Sheets

| | | YEAR | 1993 | 1994 | | | | |
|---|---|---|---|---|---|---|---|---|
| | | QUARTER | | 1 | 2 | 3 | 4 | |
| | | MEASURES | SUM OF PREDICT | SUM OF PREDICT | SUM OF PREDICT | SUM OF PREDICT | SUM OF PREDICT | |
| COUNTRY | REGION | | | | | | | |
| CANADA | | | $119,392.00 | $30,002.00 | $30,227.00 | $26,663.00 | $26,798.00 | |
| GERMANY | | | $117,119.00 | $30,977.00 | $26,606.00 | $28,318.00 | $82,534.00 | |
| USA | EAST | | $63,279.00 | $16,099.00 | $14,331.00 | $13,189.00 | $13,689.00 | |
| | WEST | | $60,484.00 | $15,757.00 | $15,700.00 | $15,262.00 | $13,932.00 | |
| | USA TOTAL | | $123,763.00 | $31,856.00 | $30,031.00 | $28,451.00 | $27,621.00 | |
| GEOGRAPHIC TOTAL | | | $360,211.00 | $92,835.00 | $86,864.00 | $83,432.00 | $82,953.00 | |
| GEOGRAPHIC ALL | | | | | | | | |

Fig. 2

| GEOGRAPHY | | MEASURES | YEAR 1993 SUM OF PREDICT | QUARTER 1 SUM OF PREDICT | 1994 2 SUM OF PREDICT | 3 SUM OF PREDICT | 4 SUM OF PREDICT |
|---|---|---|---|---|---|---|---|
| | COUNTRY | REGION | | | | | |
| | CANADA | | $119,392.00 | $30,002.00 | $30,227.00 | $26,663.00 | $26,798.00 |
| | GERMANY | | $117,119.00 | $30,977.00 | $26,606.00 | $28,318.00 | $82,534.00 |
| | USA | EAST | $63,279.00 | $16,099.00 | $14,331.00 | $13,189.00 | $13,689.00 |
| | | WEST | $60,484.00 | $15,757.00 | $15,700.00 | $15,262.00 | $13,932.00 |
| | | USA TOTAL | $123,763.00 | $31,856.00 | $30,031.00 | $28,451.00 | $27,621.00 |
| GEOGRAPHIC ALL | GEOGRAPHIC TOTAL | | $360,211.00 | $92,835.00 | $86,864.00 | $83,432.00 | $82,953.00 |

Fig. 4

| YEAR | 1993 | 1994 | | | |
|---|---|---|---|---|---|
| QUARTER | | 1 | 2 | 3 | 4 |
| MEASURES REGION | SUM OF PREDICT | SUM OF PREDICT | SUM OF PREDICT | SUM OF PREDICT | SUM OF PREDICT |
| GEOGRAPHY COUNTRY | | | | | |
| CANADA | $119,392.00 | $30,002.00 | $30,227.00 | $26,663.00 | $26,798.00 |
| GERMANY | $117,119.00 | $30,977.00 | $26,606.00 | $28,318.00 | $82,534.00 |
| USA EAST | $63,279.00 | $16,099.00 | $14,331.00 | $13,189.00 | $13,689.00 |
| WEST | $60,484.00 | $15,757.00 | $15,700.00 | $15,262.00 | $13,932.00 |
| USA TOTAL | $123,763.00 | $31,856.00 | $30,031.00 | $28,451.00 | $27,621.00 |
| GEOGRAPHIC TOTAL | $360,211.00 | $92,835.00 | $86,864.00 | $83,432.00 | $82,953.00 |

Fig. 6

MATCH TO FIG.9A

| | | | 1993 | 1994 | | |
|---|---|---|---|---|---|---|
| | | | [+][↶] | [−][↶] | | |
| | | | | [+][↶] | [+][↶] 1 | [+][↶] 2 | [+][↶] 3 |
| | | MEASURES | SUM OF PREDICT | SUM OF PREDICT | SUM OF PREDICT | SUM OF PREDICT |
| | PAY TYPE [↶] PAY TYPE ALL [−] | PAY PERIOD MONTHLY | $119,392.00 | $30,002.00 | $30,227.00 | $26,663.00 |
| GEOGRAPHY GEOGRAPHIC ALL [↶][−] | COUNTRY [+][↶] CANADA | REGION | $117,119.00 | $30,977.00 | $26,606.00 | $28,318.00 |
| | [+][↶] GERMANY | EAST | $63,279.00 | $16,099.00 | $14,331.00 | $13,189.00 |
| | [↶] USA [−] | WEST | $60,484.00 | $15,757.00 | $15,700.00 | $15,262.00 |

| QUARTER | | SUM OF PREDICT 1 | SUM OF PREDICT 2 | SUM OF PREDICT 3 | SUM OF PREDICT 4 |
|---|---|---|---|---|---|
| MEASURES | REGION | | | | |
| COUNTRY | | | | | |
| CANADA | | $30,002.00 | $30,227.00 | $26,663.00 | $26,798.00 |
| GERMANY | | $30,977.00 | $26,606.00 | $28,318.00 | $82,534.00 |
| USA | EAST | $16,099.00 | $14,331.00 | $13,189.00 | $13,689.00 |
| | WEST | $15,757.00 | $15,700.00 | $15,262.00 | $13,932.00 |

GEOGRAPHY: GEOGRAPHIC ALL

TIME ALL > 1994

Fig. 13

SYSTEM AND METHOD FOR GRAPHICALLY DISTINGUISHING LEVELS OF A MULTIDIMENSIONAL DATABASE

This application is a continuation of U.S. patent application Ser. No. 11/063,469, filed on Feb. 22, 2005 now abandoned, the entirety of which is incorporated herein by reference.

FIELD

The technology described in this patent document relates generally to database operations, and more particularly to multidimensional database processing operations.

BACKGROUND

Database technology has evolved to where multidimensional data can be stored and retrieved. In a multidimensional database, data is categorized into measures which are numerical in nature and into dimensions (e.g., textual dimensions, time dimensions, etc.) which characterize the measures. The dimensions have hierarchies and have found utility in many fields, including the data warehousing field and the Online Analytical Processing (OLAP) field. Despite the evolution of database technology, data visualization of multidimensional data has remained limited.

SUMMARY

In accordance with the teachings described herein, systems and methods are provided for graphically distinguishing levels of a multidimensional database. As an example, a method can be used with one or more processing devices in order to graphically distinguish levels of a multidimensional database and may include the steps of: receiving a query for retrieving data from the multidimensional database, wherein the multidimensional database contains a first dimension that is hierarchically arranged to categorize data in a plurality of levels; associating two or more of the plurality of levels in the first dimension with a plurality of colors; and generating display information based upon the results obtained through the query upon the multidimensional database. As another example, a system can be configured for graphically distinguishing levels from a multidimensional database and may include a server computer that includes the multidimensional database and a client computer. The client computer may be operable to retrieve data from the multidimensional database, and to execute a program for displaying information retrieved from the multidimensional database. The generated display information may be used to provide a graphical display that shows the query results categorized in at least the first dimension, wherein a plurality of colors are used to graphically distinguish the two or more levels in the first dimension. The colors may include different colors, shades of a single color, or shades of gray-scale.

BRIEF DESCRIPTION OF THE DRAWINGS

FIG. 2 illustrates an example OLAP table for displaying data from an OLAP cube.

FIG. 4 is an example of an OLAP table that uses colors to graphically distinguish between the levels in two dimensions of an OLAP cube.

FIG. 6 is another example of an OLAP table that uses colors to graphically distinguish between the levels in two dimensions of an OLAP cube.

FIG. 11 is an example of an OLAP table that uses colors to graphically distinguish between the levels in three dimensions of an OLAP cube.

FIG. 12 is another example of an OLAP table that uses colors to graphically distinguish between the levels in three dimensions of an OLAP cube.

FIGS. 13 and 14 are examples OLAP tables that illustrate the use of a color gradient scheme in a breadcrumb.

DETAILED DESCRIPTION

Figure 1:
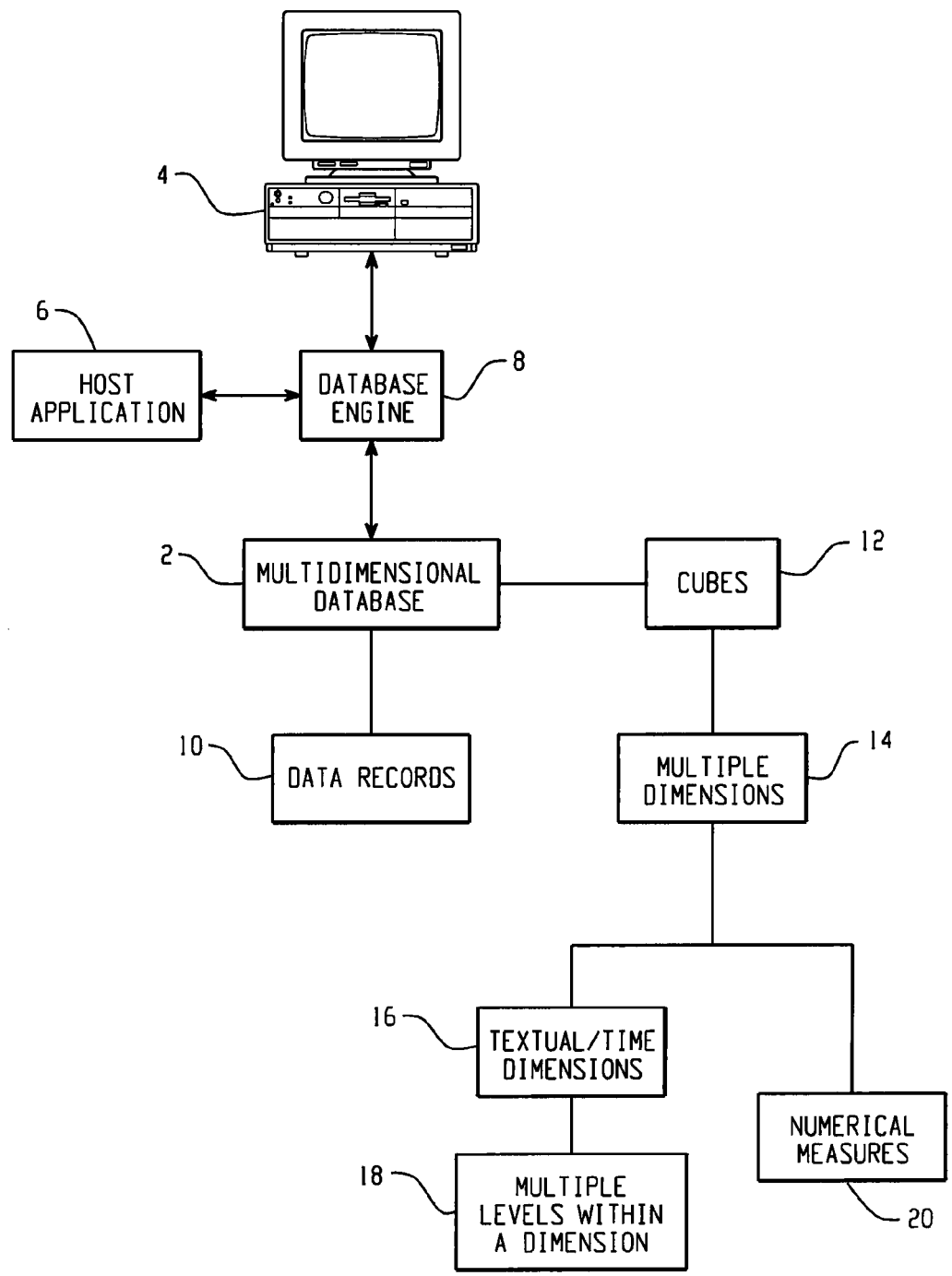
FIG. 1 is a block diagram depicting computer and software components for use with a multidimensional database and also depicting characteristics of the multidimensional database.

FIG. 1 depicts a system for use with a multidimensional database 2. An end user 4 or a host application 6 (such as a data warehousing application, or an Online Analytical Processing (OLAP) or a data mining application) initiates a query to the multidimensional database 2 via a database engine 8. The database engine 8 processes the query, such as by parsing and translating, optimizing, and evaluating in order to formulate a logical expression from the query.

The logical expression can be in the form of a plurality of terms connected via a plurality of operators such as logical operators, relational operators, arithmetic operators, etc. The engine 8 then scans the multidimensional database 2 to locate and relate data records 10 that fulfill the logical expression and return the results to the end user 4 or host application 6.

FIG. 1 further illustrates example characteristics of a multidimensional database 2. In a multidimensional database 2, data records 10 contain numerical measures 20 and dimensions (e.g., textual, time, etc.) 16 that characterize the numerical measures 20. The multidimensional database 2 views data records 10 as cubes 12 that contain hierarchies of the dimensions 14. Stated another way, a cube 12 represents a particular set of dimensions that the user can use to view the data records 10.

The dimensions 14 of the database's cubes are used for selecting and aggregating data at the desired level of detail. A dimension 16 is organized into a hierarchy composed of multiple levels 18, each representing a level of detail required by the desired analysis. For example, a dimension could contain geography information, time information, customer profile information, or other types of hierarchical data. The dimension could be arranged hierarchically starting from a general designation to a more specific one—e.g., a geography hierarchy could be arranged at a state level which could decompose to a county geographical level which could decompose even further, such as to a city or township geographical level.

A table with nested cells may be used to display data within an OLAP cube 12. The nested cells of the table can be structured such that the presence and absence of division lines represent the hierarchical nature of the data. FIG. 2 illustrates an example OLAP table 30 for displaying data from an OLAP cube. The illustrated OLAP table 30 includes two example dimensions: a time dimension 32 and a geography dimension 34. The time dimension 32 includes two levels, "year" 36 and "quarter" 38, and the geography dimension 34 includes three levels, "geography" 40, "country" 42 and "region" 44.

As illustrated, the OLAP table 30 may be expanded or collapsed to show or hide the cells in a particular level. For instance, in the illustrated example, the year level "1994" in the time dimension 32 has been expanded (e.g., by selecting a "+" icon) to show the cells at the quarter level 38, and the year level "1993" has been collapsed (e.g., by selecting a "−" icon) to show only the cells at the year level 36. Also, the country level "USA" in the geography dimension 34 has been expanded to show the cells at the region level 44 (East, West and USA Total), and the country levels "Canada" and "Germany" have been collapsed to show only the cells at the country level 42. However, because data may be expanded or collapsed at different levels within the hierarchy of the OLAP table 30, it may often be difficult to ascertain which cells are at the same level. For example, without the geographic knowledge, it may be difficult to determine by looking at the table 30 whether Germany is at the same level as USA or East and West.

Figure 3:
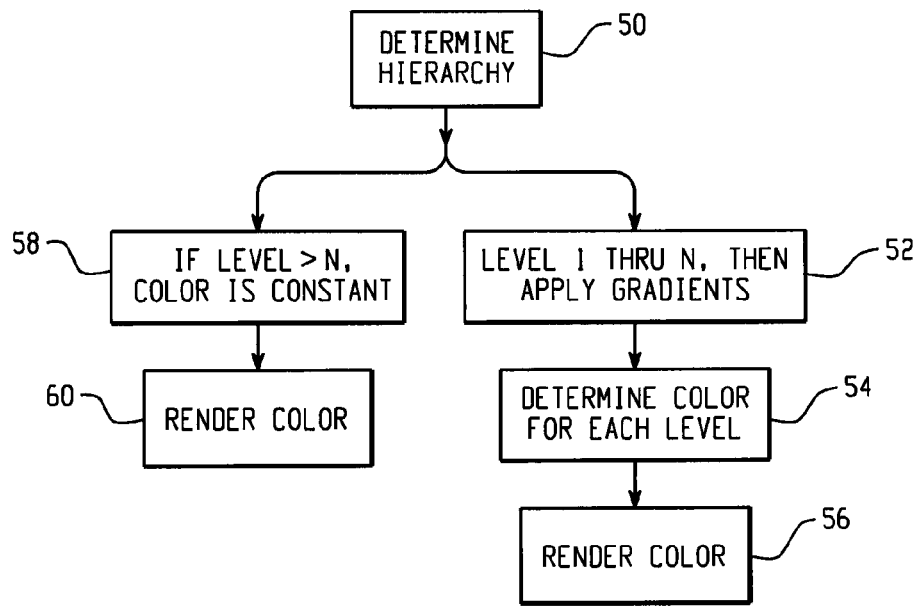
FIG. 3 is a flow diagram showing an example method for graphically distinguishing levels in a multidimensional database, such as an OLAP cube.

FIG. 3 is a flow diagram showing an example method for graphically distinguishing levels in a multidimensional database, such as an OLAP cube. The method may, for example, begin when a database software application receives a query for retrieving data from the multidimensional database. At step 50, the method determines the hierarchical structure for a first dimension of the data. For example, with reference to FIG. 2, the method may determine that the time dimension 32 includes two levels 36 and 38. Then, gradients are applied to a pre-selected number (N) of the levels at step 52, and colors are associated with each of the gradients at step 54. For instance, different colors or different shades of a single color may be associated with each of the pre-selected number (N) of levels in the dimension. If shades of a single color are used, then the levels of the dimension may be represented by progressively darker or progressively lighter shades of the color to illustrate the hierarchical nature of the data. In another example, the colors associated with each of the gradients may be different shades of gray-scale.

In step 56, the data is displayed (e.g., in an OLAP table) using the assigned colors to graphically distinguish between the levels of the dimension. In addition, if the hierarchical structure of the dimension includes more than the pre-selected number (N) of levels, then a constant color may be assigned to the remaining levels at step 58, and displayed at step 60. The method may then be repeated, if necessary, to graphically distinguish the levels of additional dimensions of the data. For instance, two or more of the levels in a first dimension of the data may be graphically distinguished using shades of a first color, and two or more of the levels in a second dimension of the data may be graphically distinguished using shades of a second color.

FIG. 4 is an example of an OLAP table 70 that uses colors to graphically distinguish between the levels in two dimensions of an OLAP cube. The OLAP table 70 illustrated in FIG. 4 includes the same data as the example 30 of FIG. 2. However, in this example, the levels of the time and geography dimensions 72, 74 are distinguished using a color gradient scheme. The levels in the geography dimension 74 are displayed using a first color (illustrated in the drawing by diagonal lines), and the levels in the time dimension 72 are displayed using a second color (illustrated in the drawing by horizontal lines).

In order to convey the hierarchical nature of the data, progressively darker shades of the color can be used to distinguish between levels in a dimension based on the depth of the level. Color shading is illustrated in the drawings by the spacing between the lines representing a color, with closer spacing representing a darker shade. For example, in the geography dimension 74 the geographic-all level is the lightest shade of the first color, the region level is the darkest shade of the first color, and the country level is a shade between the darkest and lightest. Similarly, in the time dimension 72 the year level is the lighter shade of the second color and the quarter level is the darker shade of the second color. In this manner, a user can ascertain from the color of the display the depth of the data in the overall OLAP cube structure. For instance, because the illustrated Germany level has the same gradient (i.e., the same color shading) as the USA level, and is one shade lighter than the East and West levels, the user can be certain from the display that Germany is at the same level as USA and not a level above East and West.

If a dimension in the illustrated example 70 included additional levels, then increasingly darker shades of the color may be used to distinguish from higher levels. For example, if the geography dimension 74 included a level beyond region (e.g., state, county, city, etc.), then this additional level may be displayed with a darker shade of the first color than what was used to display the region level. In one example, progressively darker shades of a color may be associated with levels of a dimension up to a pre-determined level, and then all levels beyond the pre-determined level may be displayed using the same (e.g., darkest) shade of the color.

Figure 5:
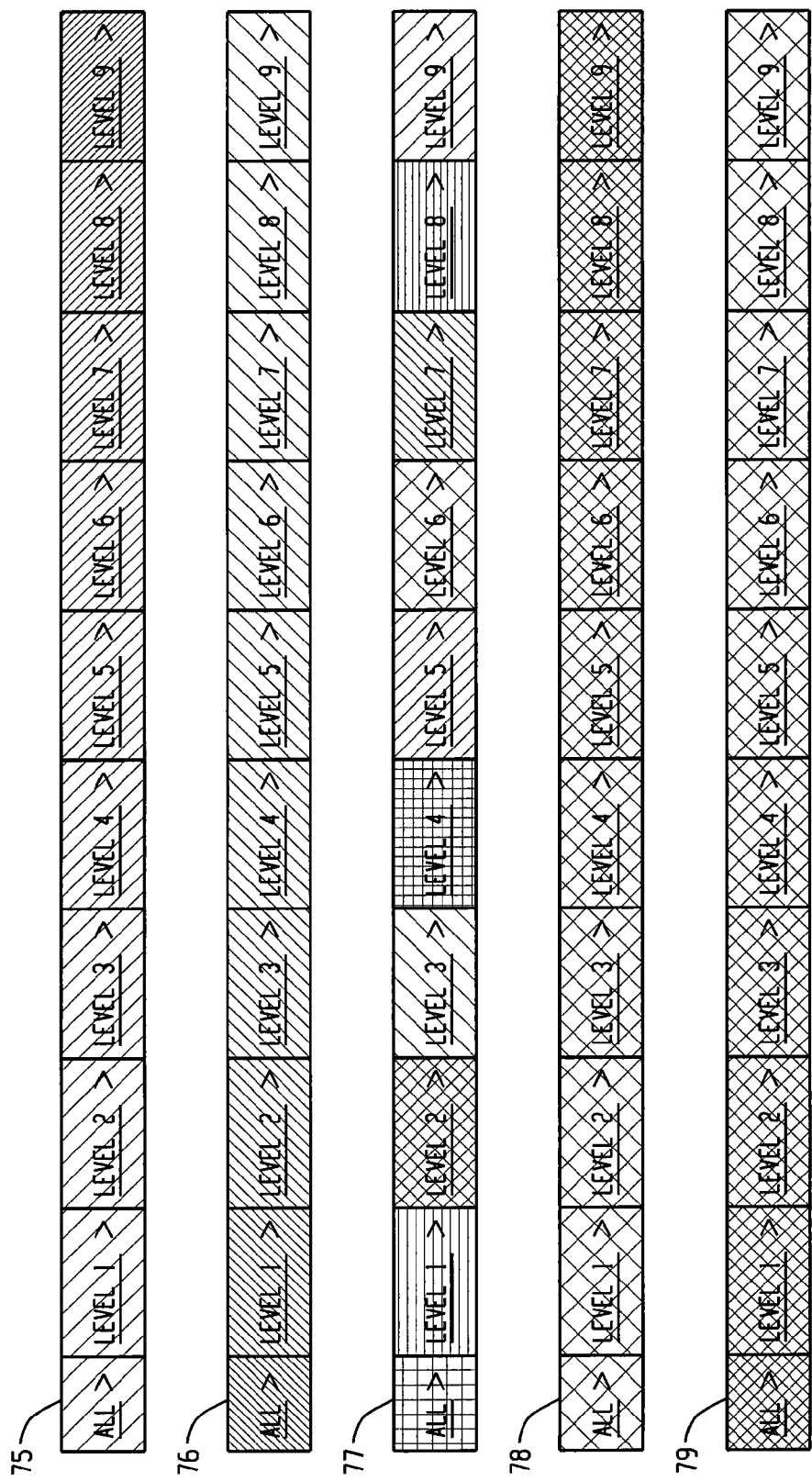
FIG. 5 illustrates five example gradient schemes that may be used to graphically distinguish levels of a multidimensional database.

FIG. 5 illustrates five example gradient schemes 75-79 that may be used to graphically distinguish levels of a multidimensional database. In the first two examples 75 and 76, the levels in a dimension are distinguished using a color gradient scheme with shades of a single color. In the first example 75, the levels are distinguished using progressively darker shades of the color, and in the second example 76, the levels are distinguished using progressively lighter shades of the color. In the third example 77, the levels in a dimension are distinguished using different colors. In the last two examples 78 and 79, the levels in a dimension are distinguished using shades of gray-scale (gray-scale is represented using a cross-hatch pattern). Specifically, in the fourth example 78 the levels are distinguished using progressively darker shades of gray-scale, and in the fifth example 79, levels are distinguished using progressively lighter shades of gray-scale. The examples illustrated in FIG. 4 and FIGS. 6-15 use a color gradient scheme similar to the first two examples, 75 and 76, shown in FIG. 5, however, other examples could use different gradient schemes, such as the gradient schemes illustrated in examples 77-79.

FIG. 6 is another example of an OLAP table 80 that uses colors to graphically distinguish between the levels in two dimensions of an OLAP cube. The OLAP table 80 in this example is similar to the example 70 of FIG. 4, except that the color gradient scheme progresses from dark to light, instead of light to dark. That is, the highest levels in a dimension are displayed using the darkest shade of a color, and deeper levels are distinguished using progressively lighter shades of the color. In the illustrated example 80, the levels of the geography dimension 84 are displayed using progressively lighter shades of a first color (illustrated by diagonal lines), and the levels of the time dimension 82 are displayed using progressively lighter shades of a second color (illustrated by horizontal lines). For example, in the geography dimension 84 the geographic-all level is the darkest shade of the first color, the region level is the lightest shade of the first color, and the country level is a shade between the darkest and lightest.

If a dimension in the example 80 of FIG. 6 included additional levels, then increasingly lighter shades may be used to distinguish from higher levels. In addition, progressively lighter shades of a color may be associated with levels up to a pre-determined level, and then all levels beyond the pre-determined level may be displayed using the same (e.g., lightest) shade of the color.

Figure 7:
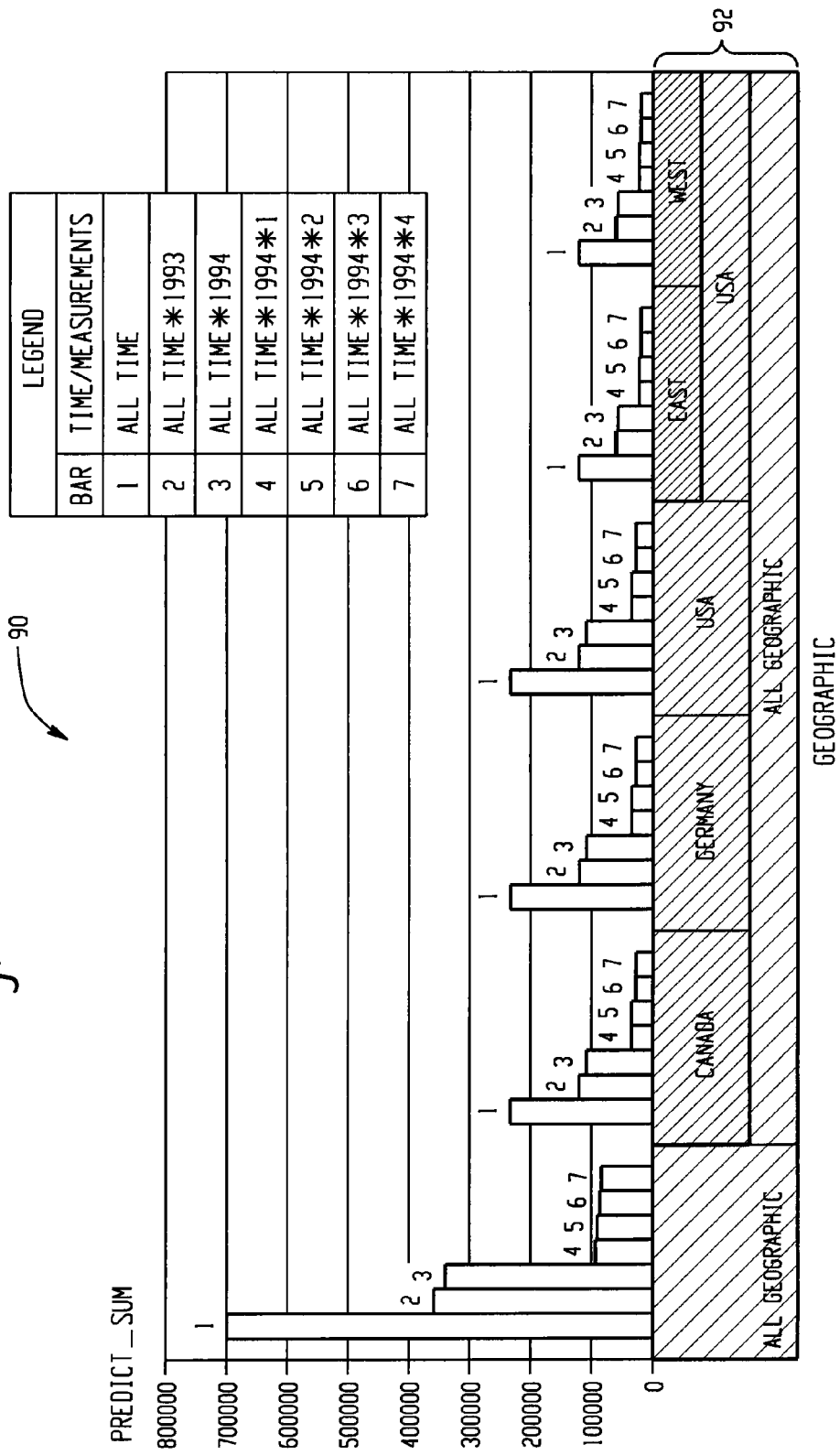
FIG. 7 is an example of an OLAP chart that uses shades of a color to graphically distinguish between the levels in a textual dimension of an OLAP cube.

FIG. 7 is an example of an OLAP chart 90 that uses shades of a color to graphically distinguish between the levels in a textual dimension of an OLAP cube. In the illustrated OLAP chart 90, three levels 92 of a geographic dimension are included along the horizontal axis of the chart 90, and the predicted sum for seven different levels (1-7) in the time dimension are illustrated by vertical bars (1-7) at each of the geography levels 92. The levels in the geography dimension 92 are distinguished using progressively darker shades of a first color (illustrated by diagonal lines) based on the depth of the level. In the illustrated example, the darkest shade is used to display the region level (East and West), the lightest shade is used to display the all-geographic level, and a shade between darkest and lightest is used to display the country level (Canada, Germany and USA).

If the geographic dimension 92 in the example of FIG. 7 included additional levels, then increasingly darker shades may be used to distinguish from higher levels. In addition, progressively darker shades of a color may be associated with levels up to a pre-determined level, and then all levels beyond the pre-determined level may be displayed using the same (e.g., darkest) shade of the color.

Figure 8:
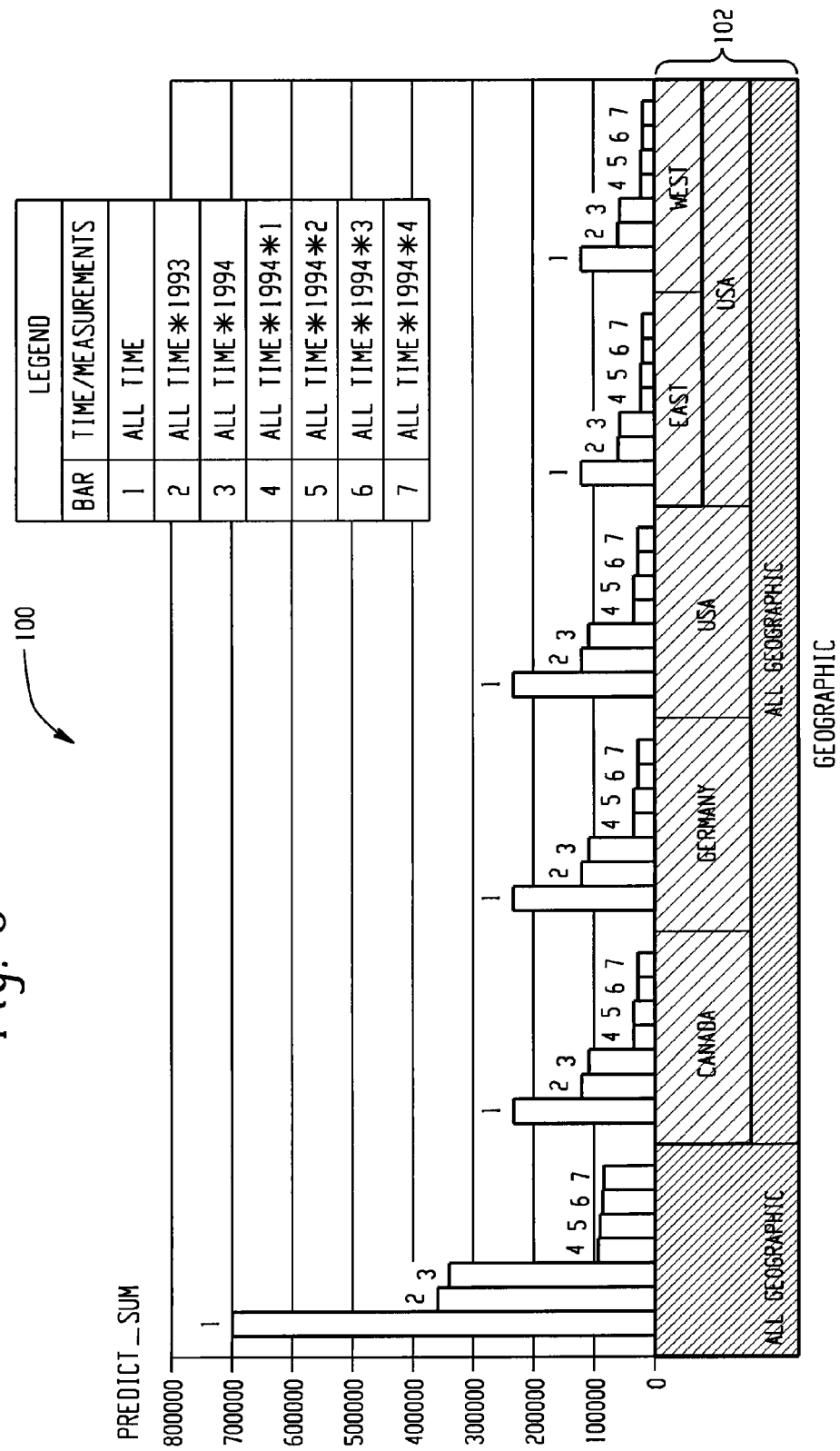
FIG. 8 is another example of an OLAP chart that uses shades of a color to graphically distinguish between the levels in a textual dimension of an OLAP cube.

FIG. 8 is another example of an OLAP chart 100 that uses shades of a color to graphically distinguish between the levels in a textual dimension of an OLAP cube. The OLAP chart 100 in this example is similar to the example 90 of FIG. 7, except that the color gradient scheme progresses from dark to light, instead of light to dark. That is, the highest level in the geographic dimension 102 is displayed using the darkest shade of the color, and deeper levels are displayed using progressively lighter shades of the color. Specifically, the geographic-all level is displayed using the darkest shade, the region level (East and West) is displayed using the lightest shade, and the country level (Canada, Germany and USA) is displayed using a shade between darkest and lightest.

If a dimension in the example 100 of FIG. 8 included additional levels, then increasingly lighter shades may be used to distinguish from higher levels. In addition, progressively lighter shades of a color may be associated with levels up to a pre-determined level, and then all levels beyond the pre-determined level may be displayed using the same (e.g., lightest) shade of the color.

Figure 9A:
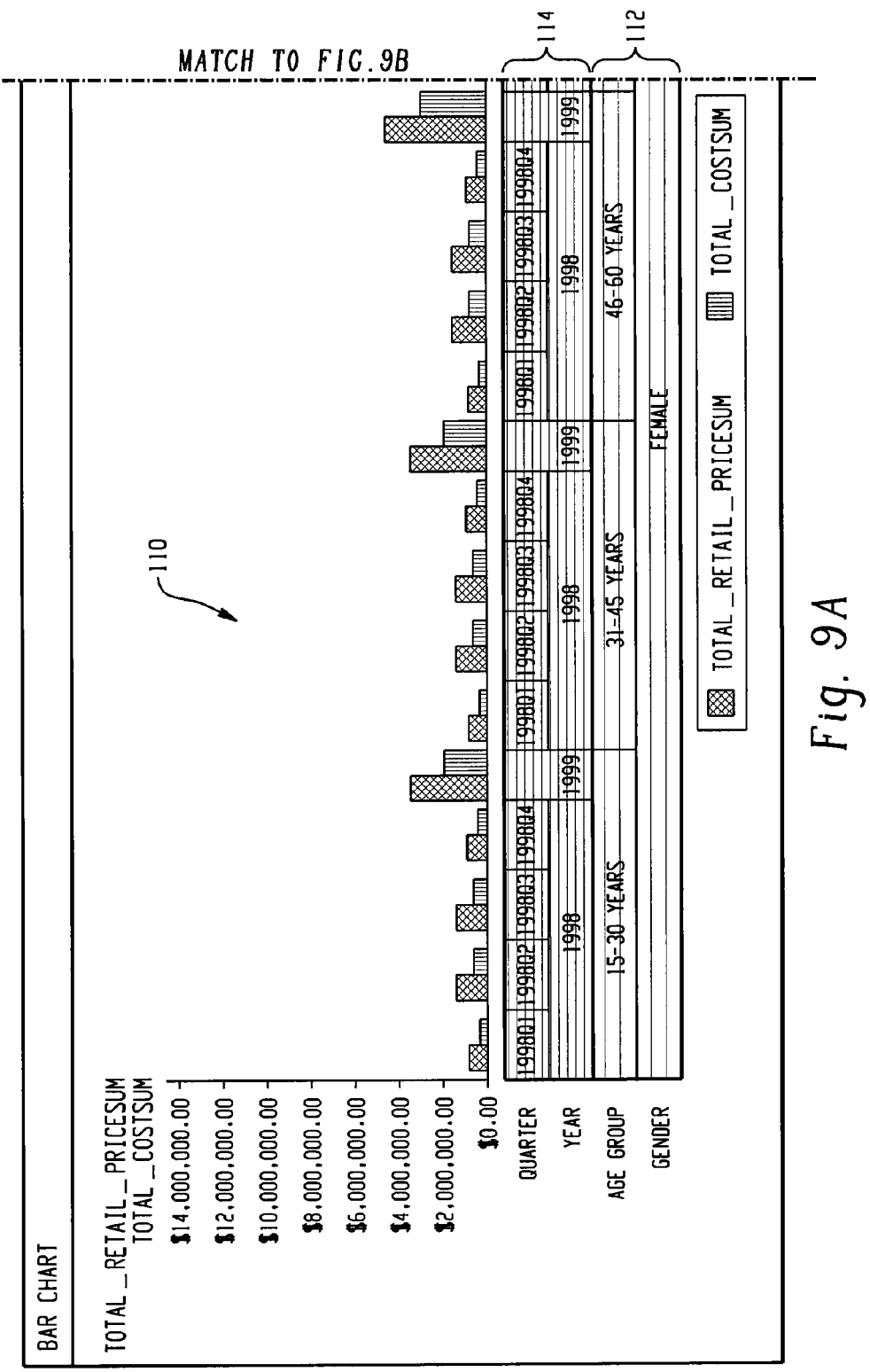
FIGS. 9A and 9B show an example OLAP chart that uses shades of a color to graphically distinguish between two dimensions in an OLAP cube.
Figure 9B:
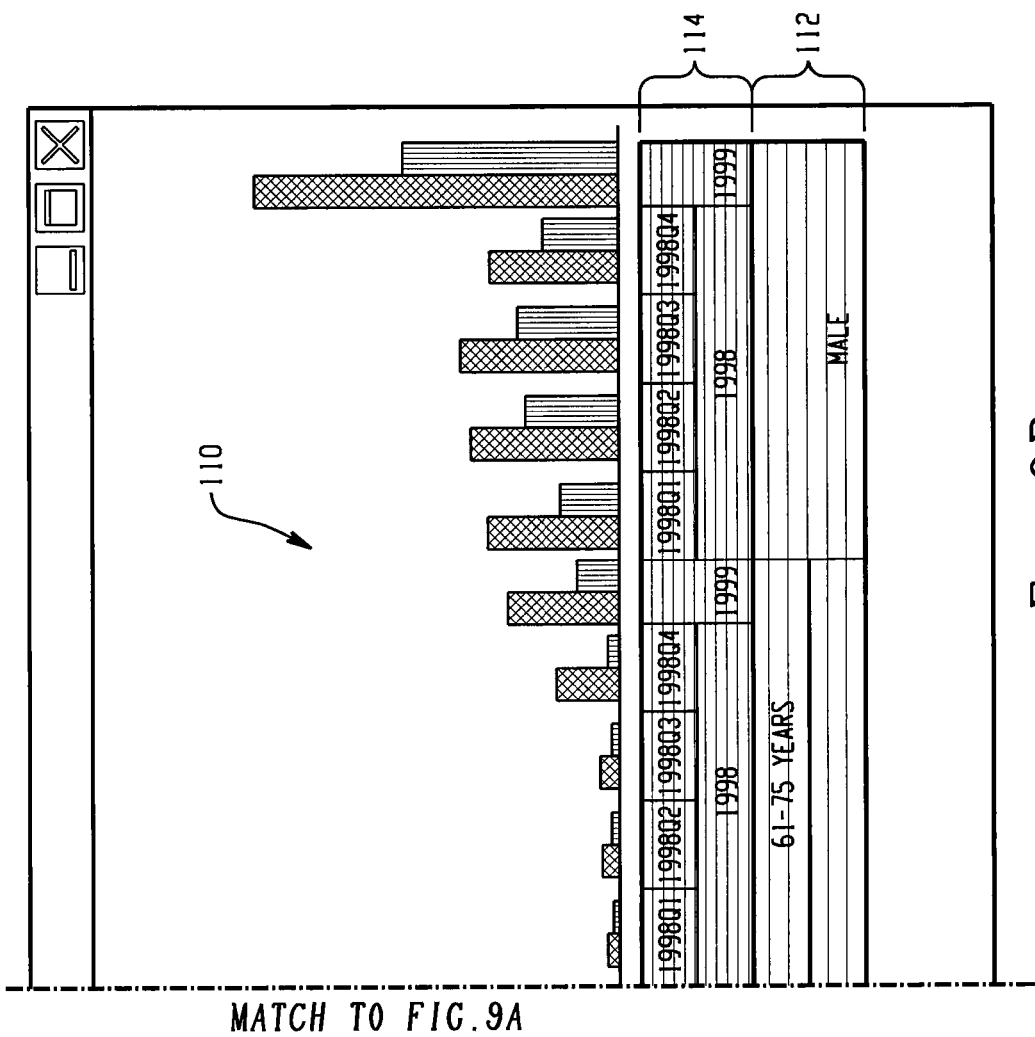

FIGS. 9A and 9B show an example OLAP chart 110 that uses shades of a color to graphically distinguish between two dimensions in an OLAP cube. In this example, two dimensions 112, 114 are along the horizontal axis of the chart 110: a consumer profile dimension 112 and a time dimension 114. Data at different levels is presented in the chart 110 by the vertical bars (Total_Retail_PriceSum and Total_CostSum). In order to distinguish between the two dimensions 112, 114 displayed along the horizontal axis of the chart 110, the levels of the consumer profile dimension 112 are displayed using a first color shading and the levels of the time dimension 114 are displayed using a second color shading. In the illustrated example, the consumer profile dimension 112 is displayed using a lighter shade of a color and the time dimension 114 is displayed using a darker shade of the color. If additional dimensions were displayed along the horizontal axis of the chart 110, then increasingly lighter or darker shades of the color may be used to distinguish the dimensions.

Figure 10A:
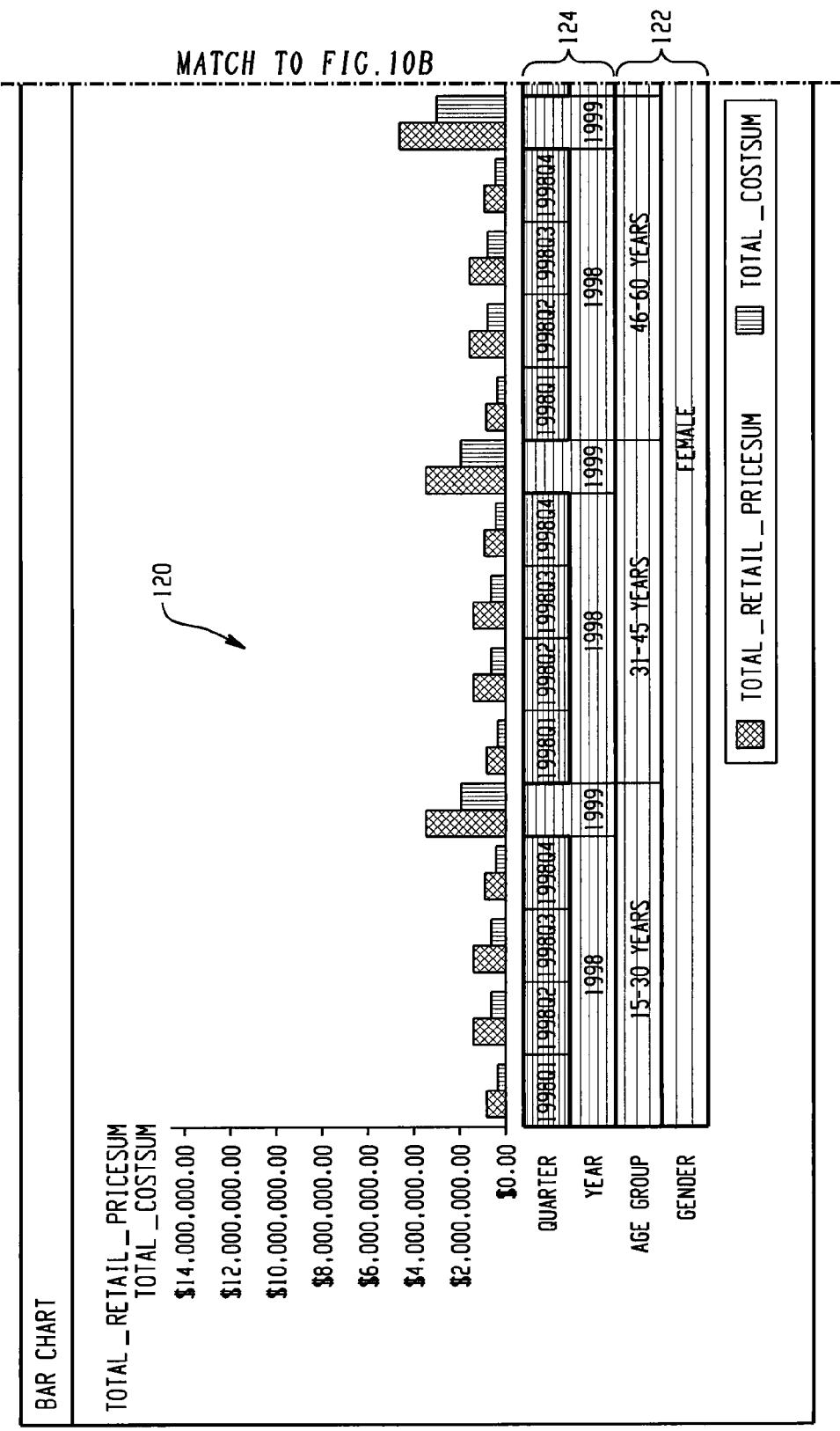
FIGS. 10A and 10B is an example of an OLAP chart that uses shades of a color to graphically distinguish between the levels in two dimensions of an OLAP cube.
Figure 10B:
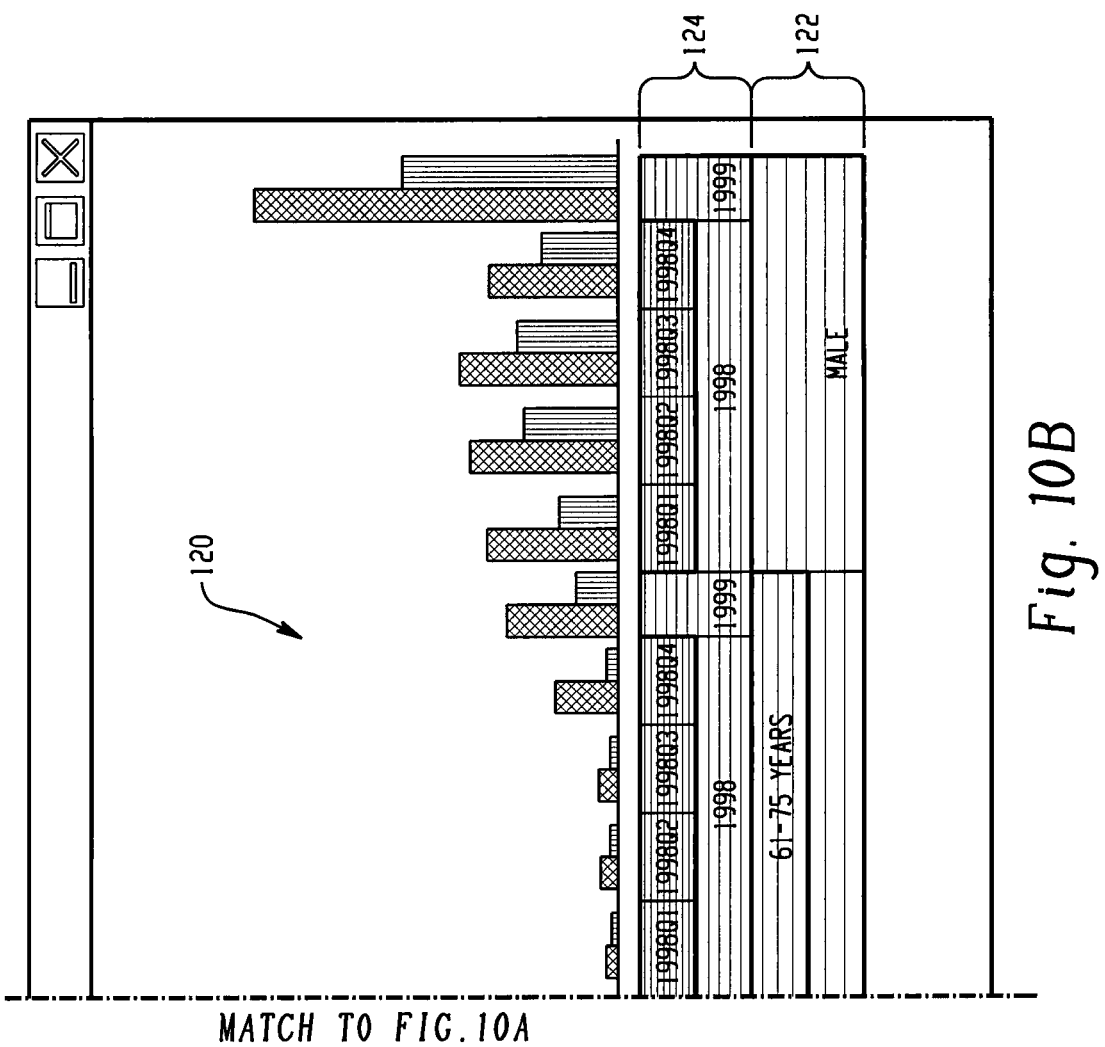

FIGS. 10A and 10B are an example of an OLAP chart 120 that uses shades of a color to graphically distinguish between the levels in two dimensions of an OLAP cube. The OLAP chart 120 in this example is similar to the example 110 of FIG. 9, except that the color gradient scheme is used to distinguish between each of the levels in the two dimensions displayed along the horizontal axis. The highest level displayed in the consumer profile dimension (gender) is displayed using the lightest shade of the color, and the next level displayed in the consumer profile dimension (age group) is displayed using the second lightest shade of the color. The levels of the time dimension 124 are displayed using shades of the color that are progressively darker than the shades used to display the customer profile dimension 122. More particularly, the highest level displayed in the time dimension 124 (year) is displayed using the third lightest shade of the color, and the deepest displayed level of the time dimension 124 (quarter) is displayed using the darkest shade of the color.

If additional levels were displayed along the horizontal axis of the chart 120, then increasingly lighter or darker shades of the color may be used. In other examples, shades of different colors could be used to distinguish the levels in different dimensions displayed along the horizontal axis of the chart 120. For example, shades of a first color could be used to distinguish the levels of the time dimension 124 and shades of a second color could be used to distinguish the levels of the consumer profile dimension 122.

FIG. 11 is an example of an OLAP table 130 that uses colors to graphically distinguish between the levels in three dimensions of an OLAP cube. The OLAP table 130 in this example is similar to the example 70 of FIG. 4, with the addition of a pay type dimension 132 displayed in the rows of the table 130 along with the geography dimension 134. In this example, the levels of the pay type dimension 132 are graphically distinguished using progressively darker shades of the same color used for the geography dimension 134. Specifically, the highest level of the pay type dimension 132 (pay type all) is displayed using the lightest shade of the color and the next displayed level (pay period) is displayed using the second lightest shade of the color.

In other examples, different colors may be used for each of the three dimensions 132, 134, 136 displayed on the table 130, and/or the levels of a dimension 132, 134, 136 may be distinguished using progressively lighter shades of a color, instead of progressively darker shades. Also, if a dimension 132, 134, 136 in the illustrated example 130 included additional levels, then increasingly darker (or lighter) shades of the color may be used to distinguish from higher levels. In addition, progressively darker (or lighter) shades of a color may be associated with levels up to a pre-determined level, and then all levels beyond the pre-determined level may be displayed using the same (e.g., darkest or lightest) shade of the color.

Figure 12:
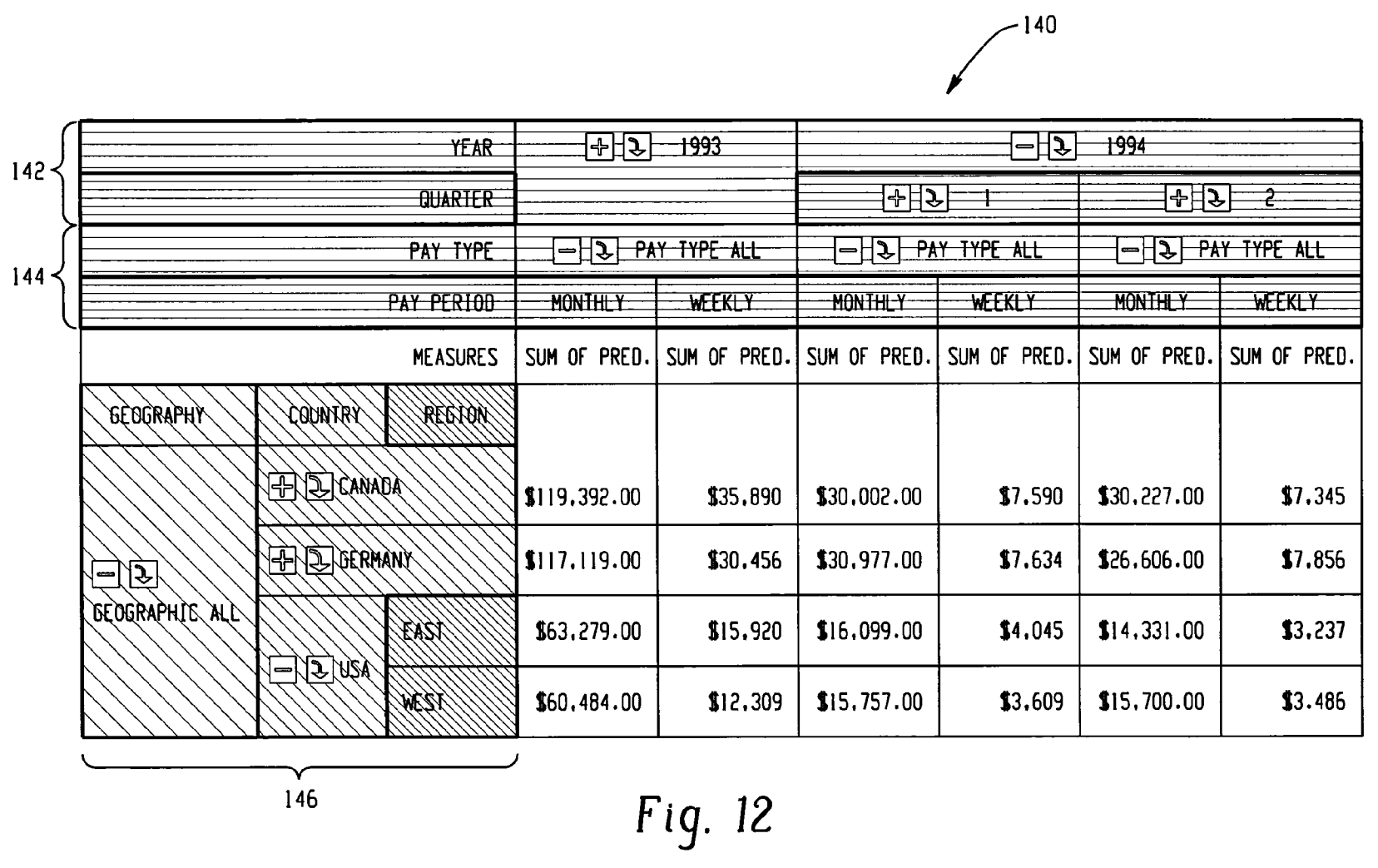

FIG. 12 is another example of an OLAP table 140 that uses colors to graphically distinguish between the levels in three dimensions 142, 144, 146 of an OLAP cube. The OLAP table 140 in this example is similar to the example 70 of FIG. 4, with the addition of a pay type dimension 144 displayed in the columns of the table 140 along with the time dimension 142. In this example, the levels of the pay type dimension 144 are graphically distinguished using progressively darker shades of the same color used for the time dimension 144. Specifically, the highest level of the pay type dimension 142 (pay type all) is displayed using the lightest shade of the color and the next displayed level (pay period) is displayed using the second lightest shade of the color.

In other examples, different colors may be used for each of the three dimensions 142, 144, 146 displayed on the table 140, and/or the levels of a dimension 142, 144, 146 may be distinguished using progressively lighter shades of a color, instead of progressively darker shades. Also, if a dimension 142, 144, 146 in the illustrated example 140 included additional levels, then increasingly darker (or lighter) shades of the color may be used to distinguish from higher levels. In addition, progressively darker (or lighter) shades of a color may be associated with levels up to a pre-determined level, and then all levels beyond the pre-determined level may be displayed using the same (e.g., darkest or lightest) shade of the color.

Figure 14:
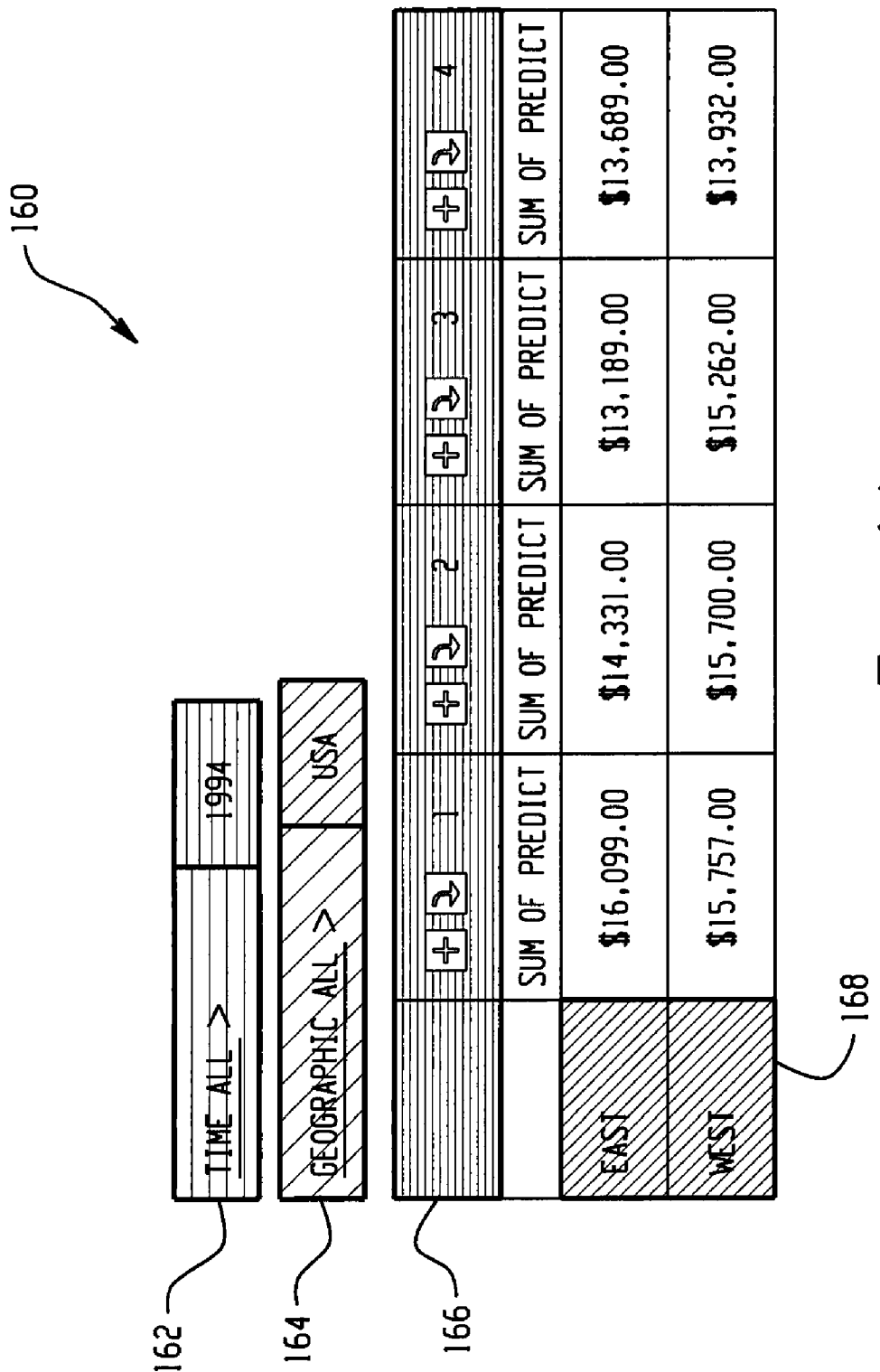

FIGS. 13 and 14 are example OLAP tables 150, 160 that illustrate the use of a color gradient scheme in a breadcrumb. The OLAP table 150 illustrated in FIG. 13 is similar to the example 70 of FIG. 4, except that the user has drilled into the year level of 1994 (e.g., by clicking on the "1994" header) to display only the quarter level 154 (the quarters from 1994, specifically) on the table 150. The two levels above the displayed quarter level 154 are shown in the breadcrumb 152 in order to provide the user with a reference for determining the depth of the data displayed on the table 150. The levels in the dimension, including both the displayed levels 154 and the levels in the breadcrumb 152, are distinguished using progressively darker shades of a color. In addition, the color gradient scheme for a dimension extends from the levels in the breadcrumb 152 to the levels 154 displayed in the table. In the illustrated example 150, the first two levels in the time dimension (time all and 1994) are displayed in the breadcrumb 152 using the two lightest shades of a color, and the third level (quarter) is displayed in the table using the darkest shade of the color.

The OLAP table 160 illustrated in FIG. 14 is similar to the example of FIG. 13, except that the user has drilled into both the year level of 1994 and the geography level USA to display only the quarter level 166 for 1994 and the region level 168 (East and West) for USA. The time-all and year levels in the time dimension are displayed in a first breadcrumb 162, and the geographic-all and country levels of the geography dimension are displayed in a second breadcrumb 164. Similar to FIG. 13, the color gradient scheme used in the OLAP table is extended into the breadcrumbs. In the time dimension, the first two levels (time all and 1994) are displayed in the first breadcrumb 162 using the two lightest shades of a first color, and the third level (quarter) is displayed in the table using the darkest shade of the first color. In the geography dimension, the first two levels (geographic all and USA) are displayed in the second breadcrumb 164, and the third level (East and West) is displayed in the table using the darkest shade of the second color.

In both FIGS. 13 and 14, additional levels in a dimension could be illustrated using progressively darker shades of the color. In other examples, progressively lighter shades of a color (or gray-scale) may be used to distinguish levels in a dimension, both in the table and in a breadcrumb, instead of progressively darker shades. In addition, progressively darker (or lighter) shades of a color may be associated with levels up to a pre-determined level, and then all levels beyond the pre-determined level may be displayed using the same (e.g., darkest or lightest) shade of the color.

Figure 15:
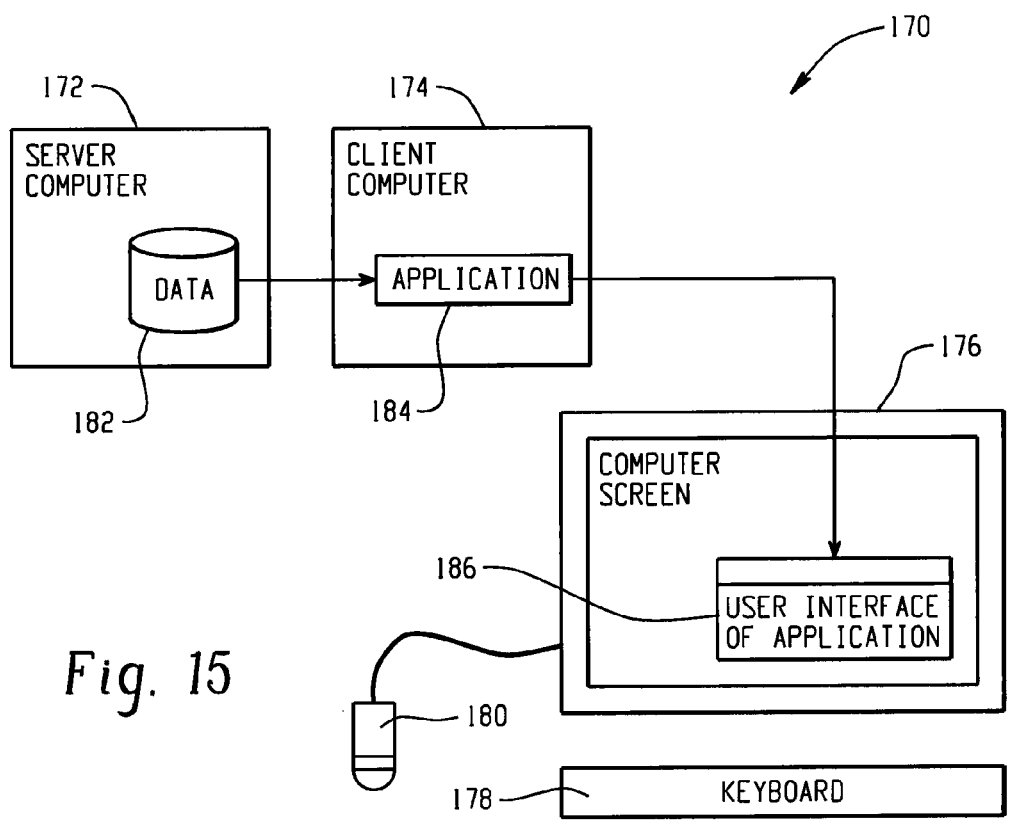
FIG. 15 is a block diagram of a system for graphically distinguishing levels of a multidimensional database.

FIG. 15 is a block diagram of a system 170 for graphically distinguishing levels of a multidimensional database. The system 170 includes a server computer 172 and a client computer 174. The client computer 174 includes a computer screen 176 and one or more input devices 178, 180. The multidimensional database 182 is stored on the server computer 172 and is accessible by a software application 184 executed on the client computer 174. The software application 184 may, for example, execute computer instructions to perform the method described above with reference to FIG. 3. A user interface 186 generated by the software application 184 is displayed on the computer screen 176. The user interface 186 may display an OLAP table or an OLAP chart that uses a gradient scheme to distinguish levels from the multidimensional database 182, as described herein This written description uses examples to disclose the invention, including the best mode, and also to enable a person skilled in the art to make and use the invention. The patentable scope of the invention may include other examples that occur to those skilled in the art. For instance, other examples may use a graphical line pattern (e.g., horizontal lines, diagonal lines, vertical lines, cross-hatch, etc.), instead of color or gray-scale, to distinguish levels from a multidimensional database. Levels within a dimension may, for example, be distinguished using increasingly more-dense or less-dense iterations of the line pattern (similar to the way in which color shading is represented in the attached drawing figures).

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A computer-implemented method for displaying data retrieved from a multidimensional database, comprising:
   receiving a query for retrieving data from the multidimensional database, the multidimensional database including a first dimension that is hierarchically arranged to categorize data in a first plurality of levels and a second dimension that is hierarchically arranged to categorize data in a second plurality of levels;
   formulating a logical expression from the query and scanning the multidimensional database to return query results that satisfy the logical expression;
   associating the first dimension within the query results with a first color and applying gradients to a predetermined number of levels in the first dimension;
   associating different shades of the first color to each of the gradients in the first dimension, wherein the predetermined number of levels in the first dimension are distinguished using progressively darker or lighter shades of the first color such that the depth of a particular level in the first dimension is determinable based on the shade of the first color associated with the particular level;
   associating the second dimension within the query results with a second color and applying gradients to a predetermined number of levels in the second dimension;
   associating different shades of the second color to each of the gradients in the second dimension, wherein the predetermined number of levels in the second dimension are distinguished using progressively darker or lighter shades of the second color such that the depth of a particular level in the second dimension is determinable based on the shade of the second color associated with the particular level; and
   generating display information based upon the query results, wherein the generated display information is for use in providing a graphical display that shows the query results categorized in at least the first and second dimensions, and wherein the different shades of the first color are displayed to graphically distinguish the predetermined number of levels in the first dimension and the different shades of the second color are displayed to graphically distinguish the predetermined number of levels in the second dimension.

2. The method of claim 1, wherein progressively darker shades of the first color are used to display the predetermined number of levels in the first dimension, and wherein a darkest of the progressively darker shades is used to display levels in the first dimension deeper than the predetermined number of levels.

3. The method of claim 1, wherein progressively darker shades of the second color are used to display the predetermined number of levels in the second dimension, and wherein a darkest of the progressively darker shades is used to display levels in the second dimension deeper than the predetermined number of levels.

4. The method of claim 1, wherein progressively lighter shades of the first color are used to display the predetermined number of levels in the first dimension, and wherein a lightest of the progressively lighter shades is used to display levels in the first dimension deeper than the predetermined number of levels.

5. The method of claim 1, wherein progressively lighter shades of the second color are used to display the predetermined number of levels in the second dimension, and wherein a lightest of the progressively lighter shades is used to display levels in the second dimension deeper than the predetermined number of levels.

6. The method of claim 1, wherein the graphical display includes an online analytical processing (OLAP) table.

7. The method of claim 1, wherein the graphical display includes an online analytical processing (OLAP) chart.

8. A system for displaying data retrieved from a multidimensional database, comprising:
   a processor; and
   a storage device that stores software instructions executable by the processor, the software instructions when executed by the processor being configured to:
      receive a query for retrieving data from the multidimensional database, the multidimensional database including a first dimension that is hierarchically arranged to categorize data in a first plurality of levels and a second dimension that is hierarchically arranged to categorize data in a second plurality of levels;
      formulate a logical expression from the query and scan the multidimensional database to return query results that satisfy the logical expression;
      associate the first dimension within the query results with a first color and apply gradients to a predetermined number of levels in the first dimension;
      associate different shades of the first color to each of the gradients in the first dimension, wherein the predetermined number of levels in the first dimension are distinguished using progressively darker or lighter shades of the first color such that the depth of a particular level in the first dimension is determinable based on the shade of the first color associated with the particular level;
      associate the second dimension with the query results with a second color and apply gradients to a predetermined number of levels in the second dimension;
      associate different shades of the second color to each of the gradients in the second dimension, wherein the predetermined number of levels in the second dimension are distinguished using progressively darker or lighter shades of the second color such that the depth of a particular level in the second dimension is determinable based on the shade of the second color associated with the particular level; and
      generate display information based upon the query results, wherein the generated display information is for use in providing a graphical display that shows the query results categorized in at least the first and second dimensions, and wherein the different shades of the first color are displayed to graphically distinguish the predetermined number of levels in the first dimension and the different shades of the second color are displayed to graphically distinguish the predetermined number of levels in the second dimension.

9. The system of claim 8, wherein progressively darker shades of the first color are used to display the predetermined number of levels in the first dimension, and wherein a darkest of the progressively darker shades is used to display levels in the first dimension deeper than the predetermined number of levels.

10. The system of claim 8, wherein progressively darker shades of the second color are used to display the predetermined number of levels in the second dimension, and wherein a darkest of the progressively darker shades is used to display levels in the second dimension deeper than the predetermined number of levels.

11. The system of claim 8, wherein progressively lighter shades of the first color are used to display the predetermined number of levels in the first dimension, and wherein a lightest of the progressively lighter shades is used to display levels in the first dimension deeper than the predetermined number of levels.

12. The system of claim 8, wherein progressively lighter shades of the second color are used to display the predetermined number of levels in the second dimension, and wherein a lightest of the progressively lighter shades is used to display levels in the second dimension deeper than the predetermined number of levels.

13. The system of claim 8, wherein the graphical display includes an online analytical processing (OLAP) table.

14. The system of claim 8, wherein the graphical display includes an online analytical processing (OLAP) chart.

\* \* \* \* \*